(12) United States Patent
Takeda et al.

(10) Patent No.: US 7,521,152 B2
(45) Date of Patent: Apr. 21, 2009

(54) NON-AQUEOUS ELECTROLYTE SECONDARY BATTERY

(75) Inventors: Katsutoshi Takeda, Kobe (JP); Hideyuki Koga, Kobe (JP); Hiroshi Sawada, Kobe (JP); Masahisa Fujimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 281 days.

(21) Appl. No.: 11/523,565

(22) Filed: Sep. 20, 2006

(65) Prior Publication Data

US 2007/0065723 A1    Mar. 22, 2007

(30) Foreign Application Priority Data

Sep. 22, 2005 (JP) .............................. 2005-276611

(51) Int. Cl.
*H01M 4/58* (2006.01)
*H01M 4/50* (2006.01)

(52) U.S. Cl. .............................. 429/231.96; 224/231.1; 224/231.9

(58) Field of Classification Search .............. 429/231.9, 429/231.95, 231.1, 231.5
See application file for complete search history.

(56) References Cited

U.S. PATENT DOCUMENTS 6,770,398 B1 * 8/2004 Atwater et al. .............. 429/224

FOREIGN PATENT DOCUMENTS

JP    2003-151549 A    5/2003

OTHER PUBLICATIONS

C.S. Johnson et al., "The Significance of the $Li_2MnO_3$ component in 'composite' $x\ Li_2MnO_3\ (1-x)\ LiMn_{0.5}O_2$ electrodes", Electrochemistry Communications, 2004, 1085-1091, 6, Argonne IL., USA.
C.S. Johnson et al., "Structural and electrochemical analysis of layered compounds from $Li_2MnO_3$", Journal of Power Sources, 1999, 491-495, 81-82, Elsevier.
MH Rossouw et al., "Lithium Manganese Oxides from $Li_2MnO_3$ For Rechargeable Lithium Battery Applications", Mat. Res. Bull., 1991, 463-473, 26, Pergamon Press plc., USA.

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

$Li_{2-x}A_xMO_3$ obtained by replacing lithium in $Li_2MO_3$ having a layered structure by an alkali metal having ion radius larger than that of lithium is used as a positive electrode active material. In this $Li_{2-x}A_xMO_3$, x satisfies the relation $0<x\leq0.5$, the above-mentioned A indicates the alkali metal having the ion radius larger than that of lithium (Li) (for example, sodium (Na) or potassium (K)) and M indicates a transition metal that can be tetravalent. Examples of the transition metal that can be tetravalent indicated by the above-mentioned M include manganese (Mn), molybdenum (Mo), titanium (Ti), platinum (Pt), iridium (Ir), ruthenium (Ru) and the like.

4 Claims, 7 Drawing Sheets

F I G. 1
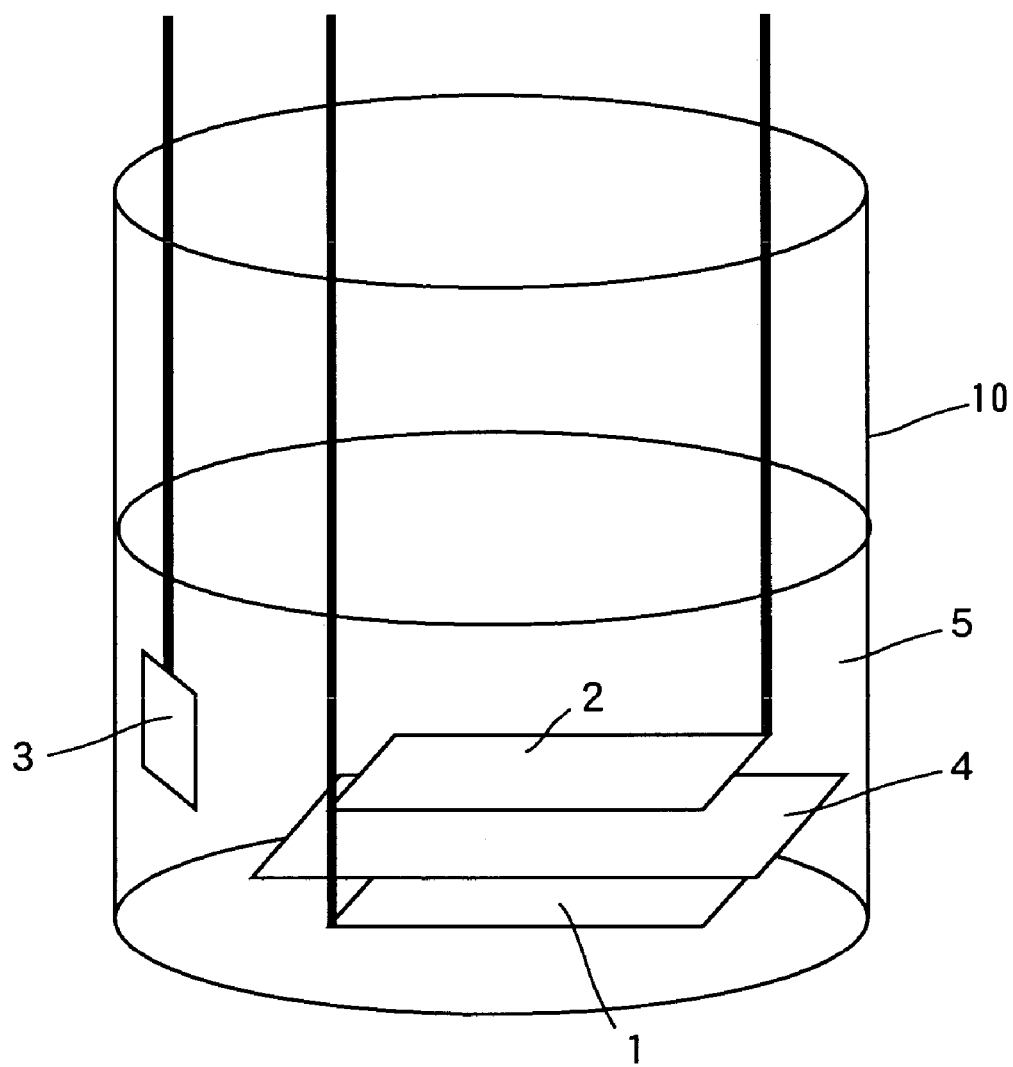

NON-AQUEOUS ELECTROLYTE SECONDARY BATTERY

BACKGROUND OF THE INVENTION

1. Field of the Invention

The present invention relates to non-aqueous electrolyte secondary batteries comprising a positive electrode, a negative electrode, and a non-aqueous electrolyte.

2. Description of the Background Art

Non-aqueous electrolyte secondary batteries are commonly available today as secondary batteries having high energy density. In a non-aqueous electrolyte secondary battery, for example, charge and discharge occur by the transfer of lithium ions between a positive electrode and a negative electrode.

In such a non-aqueous electrolyte secondary battery, in general, a complex oxide of lithium transition metals having a layered structure of lithium nickelate ($LiNiO_2$), lithium cobaltate ($LiCoO_2$) or the like is used as the positive electrode, and a carbon material that can store and release lithium ions, a lithium metal, a lithium alloy, or the like is used as the negative electrode (refer to, for example, JP-2003-151549-A).

In addition, an organic solvent such as ethylene carbonate or diethyl carbonate in which an electrolyte salt such as lithium borate tetrafluoride ($LiBF_4$) or lithium phosphate hexafluoride ($LiPF_6$) is dissolved is used as the non-aqueous electrolyte.

While these non-aqueous electrolyte secondary batteries have recently been used as power sources for mobile equipment, a need exists for developing non-aqueous electrolyte secondary batteries having higher energy densities with increasing power consumption caused by expansion in functionality of the mobile equipment.

$Li_2MO_3$ crystal (M indicates a tetravalent transition metal) is known as a material having a similar layered structure to that of the above-mentioned $LiCoO_2$. This $Li_2MO_3$ crystal is expected as a positive electrode material having a high capacity due to its high lithium content, and researches concerning the $Li_2MO_3$ crystal have been conducted by research institutes. A theoretical capacity as large as 459 mAh/g can be obtained in $Li_2MnO_3$ using low-priced manganese (Mn) as the above-mentioned tetravalent transition material.

While $Li_2MnO_3$ is expected as a positive electrode material having a high capacity, however, results of a charge/discharge test in the case of using $Li_2MnO_3$ for a positive electrode show the problems of low charge-discharge efficiency and capacity maintenance ratio (for example, refer to C. S. Johnson et al., Electrochem. Commun. 6, (2004) 1085). The above-mentioned charge-discharge efficiency (%) is defined by the ratio of specific discharge capacity to specific charge capacity and the above-mentioned capacity maintenance ratio (%) is defined by the ratio of the specific discharge capacity in a predetermined cycle (for example, tenth cycle) to that in a first cycle.

The above-mentioned problems are attributed to the fact that some of lithium ions released from a positive electrode containing $Li_2MnO_3$ in a charge process are not stored in the positive electrode in a discharge process. In addition, as charge-discharge cycles become longer, the quantity of lithium ions that are not stored increases. As a result, the charge-discharge efficiency and capacity maintenance ratio further decrease.

SUMMARY OF THE INVENTION

An object of the invention is to provide a non-aqueous electrolyte secondary battery in which charge-discharge efficiency and capacity maintenance ratio can be improved.

A non-aqueous electrolyte secondary battery according to one aspect of the invention includes a positive electrode including a positive electrode active material and capable of storing and releasing lithium, a negative electrode capable of storing and releasing lithium and a non-aqueous electrolyte, wherein the positive electrode active material contains a complex oxide including, lithium, an alkali metal and transition metals, the alkali metal has ion radius larger than that of lithium, and the transition metal includes a transition metal that can be tetravalent or a plurality of transition metals of which average valence can be tetravalent.

In the non-aqueous electrolyte secondary battery, the complex oxide including, lithium, the alkali metal and the transition metal is used as a positive electrode active material. This complex oxide can be obtained by replacing lithium in $Li_2MnO_3$ having a layered structure by an alkali metal having ion radius larger than that of lithium.

The interlayer space in the positive electrode active material is enlarged and the lithium ions are easily stored in the positive electrode active material in the discharge process by using such a complex oxide. This makes it possible to increase charge-discharge efficiency and capacity maintenance ratio.

It is preferable that the complex oxide includes $Li_{2-x}A_xMO_3$, x is more than 0 and not more than 0.5, A is an alkali metal and M is a transition metal.

When x is 0.5 or less, an alkali metal compound is prevented from being separated off as impurities due to the fact that the alkali metal is substituted for lithium in the positive electrode active material. Thus, it is possible to obtain good charge/discharge characteristics.

The alkali metal is preferably sodium. In this case, it is possible to reduce the cost of the positive electrode by using low-priced sodium.

The alkali metal is preferably potassium and x is preferably more than 0 and not more than 0.3. In this case, it is possible to reduce the cost of the positive electrode by using low-priced potassium.

In addition, when x is 0.3 or less, a potassium compound is prevented from being separated off as impurities due to the fact that the potassium is substituted for lithium in the positive electrode active material. Thus, it is possible to obtain good charge/discharge characteristics.

The transition metal that can be tetravalent is preferably manganese. In this case, a crystal structure of the positive electrode active material is stabilized. Thus, it is possible to obtain good charge/discharge characteristics.

According to the present invention, the interlayer space in the positive electrode active material is enlarged and lithium ions are easily stored in the positive electrode active material in the discharge process. This makes it possible to increase charge-discharge efficiency and capacity maintenance ratio.

Other features, elements, characteristics, and advantages of the present invention will become more apparent from the following description of preferred embodiments of the present invention with reference to the attached drawings.

BRIEF DESCRIPTION OF THE DRAWINGS

FIG. 1 is a schematic diagram of a test cell of a non-aqueous electrolyte secondary battery according to an embodiment of the invention.

DESCRIPTION OF THE PREFERRED EMBODIMENTS

Figure 2:
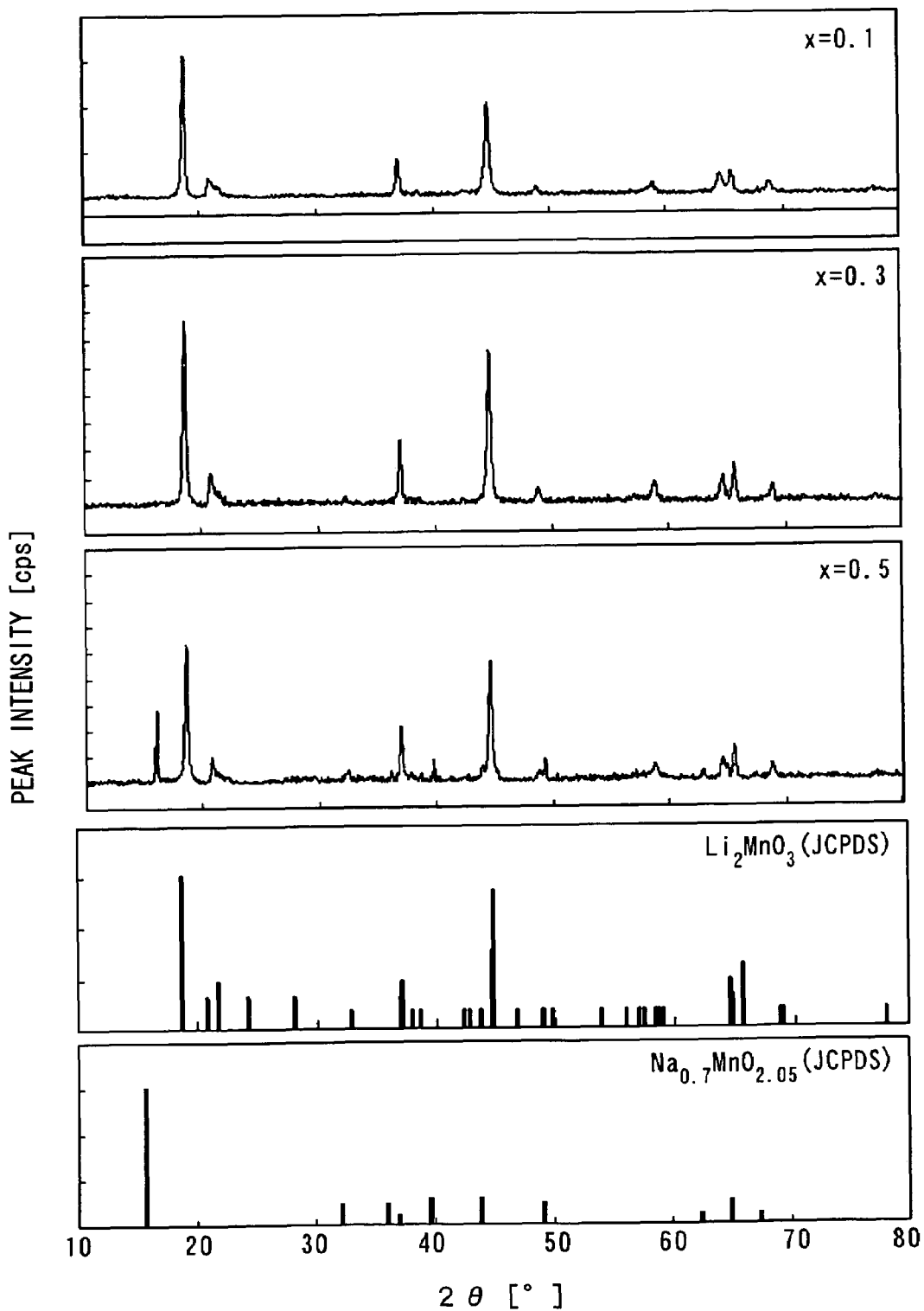
FIG. 2 is a graph showing the measurement results of an XRD measurement of each positive electrode active material in Inventive Example 1.

A non-aqueous electrolyte secondary battery according to an embodiment of the invention will be described below with reference to drawings.

The non-aqueous electrolyte secondary battery according to the embodiment comprises a working electrode (hereinafter, referred to as a positive electrode), a counter electrode (hereinafter, referred to as a negative electrode), and a non-aqueous electrolyte.

Note that materials described below and the thickness and the concentration thereof are not limited to the after-mentioned and can be appropriately selected.

(1) Fabrication of Positive Electrode

In this embodiment, $Li_{2-x}A_xMO_3$ obtained by replacing lithium in $Li_2MO_3$ having a layered structure by an alkali metal having ion radius larger than that of lithium is used as a positive electrode active material.

In this $Li_{2-x}A_xMO_3$, x satisfies the relation $0<x \leq 0.5$, A indicates an alkali metal having the ion radius larger than that of lithium (Li) and M indicates a transition metal that can be tetravalent.

Examples of transition metals that can be tetravalent indicated by the above-mentioned M include manganese (Mn), molybdenum (Mo), titanium (Ti), platinum (Pt), iridium (Ir), ruthenium (Ru) and the like.

In addition, a combination of not less than two types selected from transition metals that can be trivalent such as cobalt (Co), nickel (Ni) and the like and transition metals that can be pentavalent such as vanadium (V), niobium (Nb), tantalum (Ta) and the like may be used are combined, of which average valence can be tetravalent.

It is preferable that low-priced sodium (Na) or potassium (K) is used as the alkali metal indicated by the above-mentioned A.

In positive electrode active material $Li_{2-x}Na_xMO_3$ in the case of using sodium as the alkali metal, the relation is preferably $0<x \leq 0.5$. This is because that sodium is not substituted for lithium in $Li_2MnO_3$, so that a sodium compound is separated off as impurities, when x is more than 0.5.

Furthermore, in positive electrode active material $Li_{2-x}K_xMO_3$ in the case of using potassium as the alkali metal, the relation is preferably $0<x \leq 0.3$. This is because potassium is not substituted for lithium in $Li_2MnO_3$, so that a potassium compound is separated off as impurities, when x is more than 0.3.

Although a conducting agent may not be added during fabrication of the positive electrode in the case of using the positive electrode active material with high conductivity, it is preferable to add the conducting agent in the case of using the positive electrode active material with low conductivity.

Any materials with conductivity may be used as the conducting agent, and at least one of an oxide, a carbide, a nitride and a carbon material, which have high conductivity, can be preferably used.

Examples of the oxide with high conductivity include Tin oxide, indium oxide and the like. Examples of the carbide with high conductivity include titanium carbide (TiC), tantalum carbide (TaC), niobium carbide (NbC), zirconium carbide (ZrC), tungsten carbide (WC) and the like.

In addition, examples of the nitride with high conductivity include titanium nitride (TiN), tantalum nitride (TaN), niobium nitride (NbN), tungsten nitride (WN) and the like. Examples of the carbon material with high conductivity include Ketjen black, acetylene black, graphite and the like.

While it is difficult to improve the conductivity at the positive electrode sufficiently if the amount of an added conducting agent is small, the proportion of the positive electrode active material contained in the positive electrode is small and high energy density is not obtained if the amount of the added conducting agent is large. Accordingly, the amount of the added conducting agent is set to be within the range of 0 to 30% by weight of the entire positive electrode, preferably within the range of 0 to 20% by weight and more preferably within the range of 0 to 10% by weight.

Furthermore, as a binder added during the fabrication of the positive electrode, at least one type selected from the group consisting of polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, carboxymethylcellulose and the like can be used.

Note that the proportion of the positive electrode active material contained in the positive electrode is small and high energy density is not obtained if the amount of the added binder is large. Accordingly, the amount of the added binder is set to be within the range of 0 to 30% by weight of the entire positive electrode, preferably within the range of 0 to 20% by weight and more preferably within the range of 0 to 10% by weight.

(2) Fabrication of Non-Aqueous Electrolyte

A non-aqueous electrolyte that includes an electrolytic salt dissolved in a non-aqueous solvent can be used.

The non-aqueous solvent may include that for use in general batteries such as cyclic carbonic esters, chain carbonic esters, esters, cyclic ethers, chain ethers, nitrils, amides, or the like and that made by combinations of these.

Cyclic carbonic esters include ethylene carbonate, propylene carbonate, butylene carbonate, and the like. Those in which a portion of or the entire hydrogen group is fluorinated may also be used, such as trifluoropropylene carbonate, fluoroethylene carbonate, and the like, for example.

Chain carbonic esters include dimethyl carbonate, ethyl methyl carbonate, diethyl carbonate, methyl propyl carbonate, ethyl propyl carbonate, methyl isopropyl carbonate, and the like. Those in which a portion of or the entire hydrogen group is fluorinated may also be used.

Esters include methyl acetate, ethyl acetate, propyl acetate, methyl propionate, ethyl propionate, γ-butyrolactone, and the like. Cyclic ethers include 1,3-dioxolane, 4-methyl-1,3-dioxolane, tetrahydrofuran, 2-methyl tetrahydrofuran, propylene oxide, 1,2-butylene oxide, 1,4-dioxane, 1,3,5-trioxane, furan, 2-methylfuran, 1,8-cineole, crown ether, and the like.

Chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like.

Nitrils include acetonitril and the like. Amides include dimethylformamide and the like.

As the electrolytic salt in the embodiment, those used typically as an electrolytic salt of conventional non-aqueous electrolyte secondary batteries can be used.

A specific example of the electrolytic salt is selected from the group consisting of lithium phosphate hexafluoride ($LiPF_6$), lithium borate tetrafluoride ($LiBF_4$), $LiCF_3SO_3$, $LiC_4F_9SO_3$, $LiN(CF_3SO_2)_2$, $LiN(C_2F_5SO_2)_2$, $LiAsF_6$ and difluoro (oxalato) lithium borate that are soluble in a non-aqueous solvent, not peroxide, and have high safety. One or combinations of not less than two of the above-mentioned electrolytic salts may be used.

In this embodiment, a non-aqueous solvent obtained by mixing ethylene carbonate and diethyl carbonate at a volume ratio of 30:70 is used as a non-aqueous electrolyte with the addition of lithium phosphate hexafluoride as an electrolytic salt at a concentration of 1 mol/l.

(3) Configuration of Negative Electrode

In this embodiment, materials capable of storing and releasing lithium ions are used. Examples of these materials include a lithium metal, a lithium alloy, a carbon material such as graphite, and silicon (Si).

(4) Fabrication of Non-aqueous Electrolyte Secondary Battery

The non-aqueous electrolyte secondary battery is fabricated as described below using the above-described positive electrode, negative electrode and non-aqueous electrolyte.

FIG. 1 is a schematic diagram of a test cell of the non-aqueous electrolyte secondary battery according to the embodiment of the invention.

As shown in FIG. 1, leads are attached to the above-described positive electrode 1 and negative electrode 2 that is composed of, for example, a lithium metal, respectively, under an inert atmosphere. Next, a separator 4 is inserted between the positive electrode 1 and the negative electrode 2, and then the positive electrode 1, negative electrode 2, and reference electrode 3 that is composed of, for example, a lithium metal are arranged inside a cell vessel 10. The above-described non-aqueous electrolyte 5 is poured into the cell vessel 10 to fabricate the non-aqueous electrolyte secondary battery as a test cell.

(5) Effects of the Embodiment

In this embodiment, $Li_{2-x}A_xMO_3$ obtained by replacing lithium in $Li_2MO_3$ having a layered structure by the alkali metal having the ion radius larger than that of lithium is used as the positive electrode active material. Thus, the interlayer space in the positive electrode active material is enlarged and lithium ions are easily stored in the positive electrode active material in a discharge process. This makes it possible to increase capacity maintenance ratio and charge-discharge efficiency.

INVENTIVE EXAMPLES (a) Inventive Example 1

Lithium carbonate ($Li_2CO_3$), manganese carbonate ($MnCO_3$) and sodium carbonate ($Na_2CO_3$) were used as starting materials of positive electrode active materials.

In this example, a total of three types of powders of positive electrode active materials were obtained in the cases where x in $Li_{2-x}Na_xMnO_3$ is 0.1, 0.3 and 0.5 by mixing the above-mentioned lithium carbonate, manganese carbonate and sodium carbonate.

In addition, the obtained three types of powders of the positive electrode active materials were formed in the shape of pellets, respectively. After that, preliminary burning was carried out on each of these positive electrode active materials in the air atmosphere of 650° C. for ten hours and main burning was carried out in the air atmosphere of 700° C. for twenty hours.

Next, the respective positive electrode active materials obtained by carrying out the main burning were measured by an XRD (X-ray diffraction instrument).

FIG. 2 is a graph showing the measurement results of the XRD measurement of each positive electrode active material in Inventive Example 1.

FIG. 2 shows the XRD measurement results of three types of positive electrode active materials with different values of x (x=0.1, 0.3 and 0.5), X-ray diffraction data of $Li_2MnO_3$ in which a crystal system (crystal structure) belongs to the space group C2/c and X-ray diffraction data of $Na_{0.7}MnO_{2.05}$ which is a sodium compound in JCPDS (Joint Committee on Powder Diffraction Standards) where X-ray diffraction data of approximately six thousand kinds of inorganic compounds and organic compounds are included.

The results of the XRD measurement shown in FIG. 2 indicate that the respective positive electrode active materials obtained by the main burning have crystal systems that belong to the space group C2/c similarly to that of $Li_2MnO_3$.

Furthermore, lattice constants of the positive electrode active materials in the cases where the relation is x=0.1 and 0.3 were calculated based on the XRD measurement results in FIG. 2. The calculation results are shown in Table 1.

TABLE 1

| SODIUM QUANTITY | a [Å] | b [Å] | c [Å] |
|---|---|---|---|
| x = 0.1 | 4.9267 | 8.5080 | 9.6279 |
| x = 0.3 | 4.9308 | 8.5003 | 9.6592 |

As shown in Table 1, from the fact that the lattice constants increase excluding one of them, as the quantity of sodium increases in the positive electrode active materials, it is found out that lithium in the positive electrode active materials was replaced by sodium.

The XRD measurement results of the positive electrode active material in the case of x=0.5 show that the values of the peak intensities of a sodium compound as impurities increased at diffraction angles 2θ approximately in the range of 15 to 16°. This is considered to be because part of sodium is not substituted for lithium in the positive electrode active material, so that the sodium compound is separated off as impurities.

(b) Inventive Example 2

Lithium carbonate ($Li_2CO_3$), manganese carbonate ($MnCO_3$) and potassium carbonate ($K_2CO_3$) were used as starting materials of positive electrode active materials.

In this example, a total of three types of powders of the positive electrode active materials were obtained in the cases where x in $Li_{2-x}K_xMnO_3$ is 0.1, 0.3 and 0.5 by mixing the above-mentioned lithium carbonate, manganese carbonate and potassium carbonate.

In addition, the obtained three types of powders of the positive electrode active materials were formed in the shape of pellets, respectively. After that, preliminary burning was carried out on each of these positive electrode active materials in the air atmosphere of 650° C. for ten hours and main burning was carried out in the air atmosphere of 700° C. for twenty hours.

Next, the respective positive electrode active materials obtained by carrying out the main burning were measured by an XRD (X-ray diffraction instrument).

Figure 3:
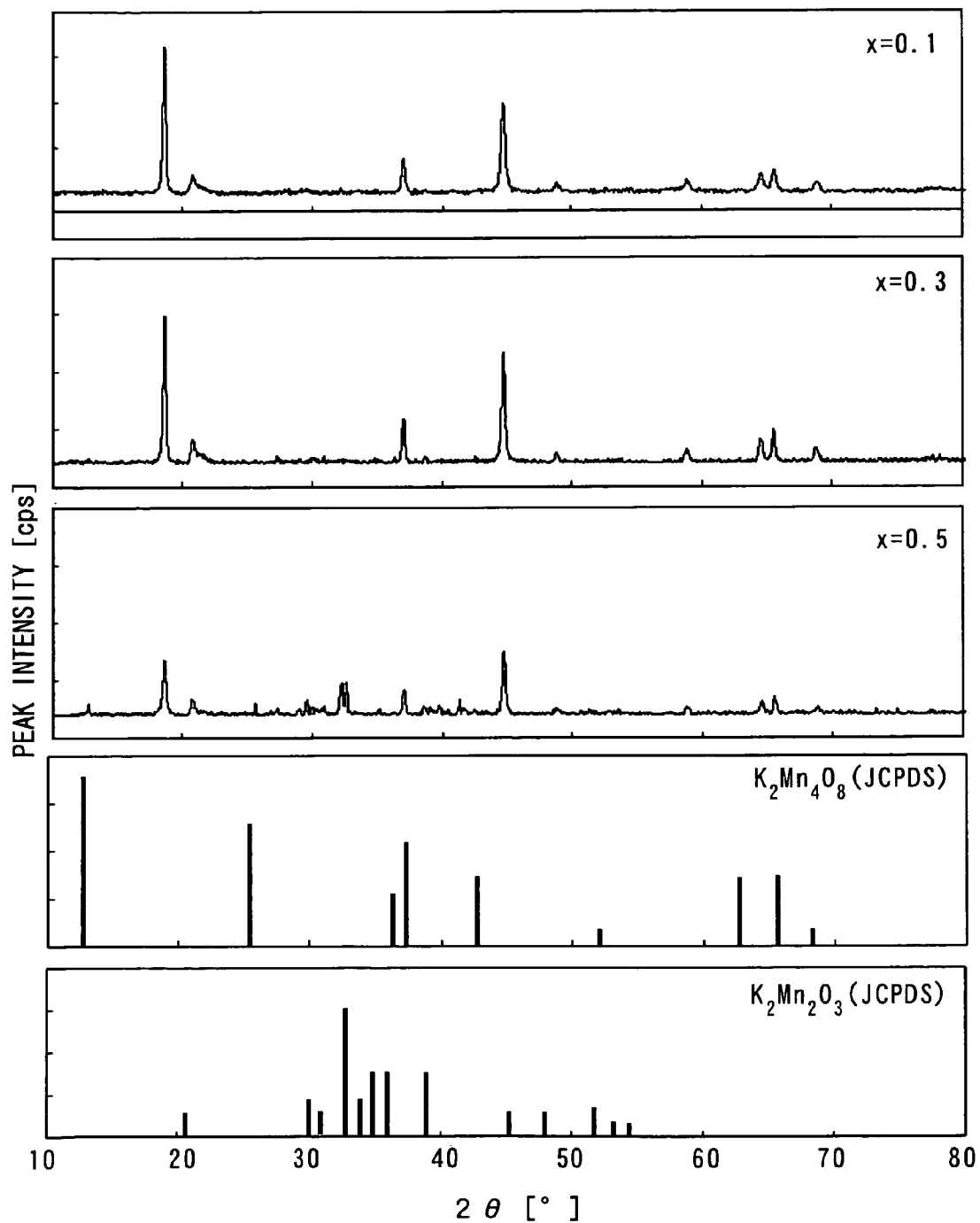
FIG. 3 is a graph showing the measurement results of the XRD measurement of each positive electrode active material in Inventive Example 2.

FIG. 3 is a graph showing the measurement results of the XRD measurement of each positive electrode active material in Inventive Example 2.

The XRD measurement results of three types of positive electrode active materials with different values of x (x=0.1, 0.3 and 0.5) and the X-ray diffraction data of $K_2Mn_4O_8$ and $K_2Mn_2O_3$ in which the crystal system (crystal structure) is a potassium compound in the JCPDS are shown in FIG. 3.

The results of the XRD measurement as shown in FIG. 3 indicate that the respective positive electrode active materials obtained by the main burning have crystal systems that belong to the space group C2/c similarly to $Li_2MnO_3$.

Furthermore, the lattice constants of the positive electrode active materials in the cases of x=0.1 and 0.3 were calculated based on the XRD measurement results in FIG. 3. The calculation results are shown in Table 2.

TABLE 2

| POTASSIUM QUANTITY | a [Å] | b [Å] | c [Å] |
|---|---|---|---|
| x = 0.1 | 4.9288 | 8.4955 | 9.6323 |
| x = 0.3 | 4.9321 | 8.5109 | 9.6516 |

As shown in Table 2, from the fact that the lattice constants increase, as the quantity of potassium increases in the positive electrode active materials, it is found out that lithium in the positive electrode active materials was replaced by potassium.

The XRD measurement results of the positive electrode active material in the case of x=0.5 show that the values of the peak intensities of a potassium compound as impurities increased at diffraction angles 2θ approximately in the range of 30 to 40°. This is considered to be because part of potassium is not substituted for lithium in the positive electrode active material, so that the potassium compound is separated off as an impurity.

(c) Comparative Example

In Comparative Example, lithium carbonate ($Li_2CO_3$) and manganese carbonate ($MnCO_3$) were used as starting materials of the positive electrode active material and $Li_2MnO_3$ as the positive electrode active material was obtained by mixing the above-mentioned lithium carbonate and manganese carbonate in a mole ratio of 1:1.

In addition, the obtained powders of the positive electrode active material mentioned above were formed in the shape of a pellet. After that, preliminary burning was carried out on this positive electrode active material in the air atmosphere of 500° C. for ten hours and main burning was carried out in the air atmosphere of 500° C. for twenty hours.

The positive electrode active material obtained by carrying out the main burning was measured by the XRD (X-ray diffraction instrument).

Figure 4:
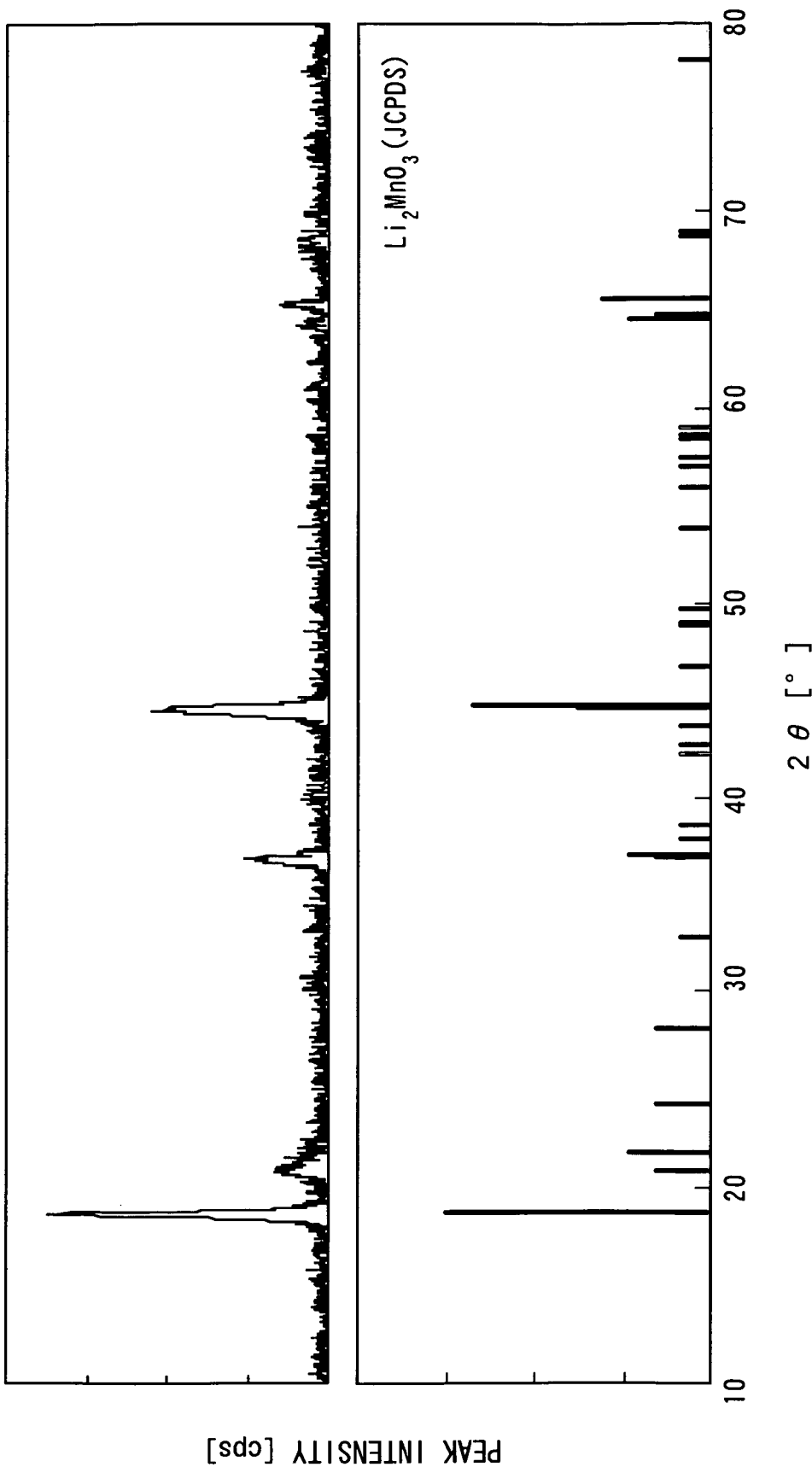
FIG. 4 is a graph showing the measurement results of the XRD measurement of a positive electrode active material in Comparative Example.

FIG. 4 is a graph showing the measurement results of the XRD measurement of the positive electrode active material in Comparative Example.

The X-ray diffraction data of $Li_2MnO_3$ in which the crystal system (crystal structure) belongs to the space group C2/c similarly to $Li_2MnO_3$ in the JCPDS are shown in FIG. 4.

The results of the XRD measurement as shown in FIG. 4 indicate that the positive electrode active material obtained by the main burning has the crystal system that belongs to the space group C2/c similarly to $Li_2MnO_3$.

(d) Inventive Example 3

(d-1) Fabrication of Non-Aqueous Electrolyte Secondary Battery

Positive electrodes 1 were fabricated as described below using the respective positive electrode active materials fabricated in Inventive Examples 1, 2 and Comparative Example.

Positive electrode materials were obtained respectively by mixing 80% by weight of the positive electrode active materials obtained in Inventive Examples 1, 2 and Comparative Example, 10% by weight of conducting agents of acetylene black, and 10% by weight of binders of polyvinylidene fluoride.

Slurries as positive electrode mixtures were prepared by adding the respective positive electrode materials to N-methyl-2-pyrrolidone solution.

The prepared slurries were subsequently applied onto positive electrode collectors by the doctor blade technique and then dried at 110° C. under vacuum, thereby forming positive electrode active material layers. In addition, the positive electrodes 1 were obtained by attaching positive electrode tabs onto regions of the positive electrode collectors where the positive electrode active material layers were not formed. Lithium metals cut into a predetermined size were used for the negative electrodes 2 and the reference electrodes 3.

Furthermore, a non-aqueous solvent obtained by mixing ethylene carbonate and diethyl carbonate in a volume ratio of 30:70 was used as the non-aqueous electrolyte 5 with the addition of lithium phosphate hexafluoride as an electrolyte salt at a concentration of 1 mol/l.

The test cells of the non-aqueous electrolyte secondary batteries were fabricated based on the above-mentioned embodiment (FIG. 1) using the above-described positive electrodes 1, negative electrodes 2, reference electrodes 3 and non-aqueous electrolytes 5.

(d-2) Charge/Discharge Test

For each of the non-aqueous electrolyte secondary batteries including the positive electrode active materials obtained in Inventive Examples 1, 2 (hereinafter, referred to as non-aqueous electrolyte secondary batteries of Inventive Examples 1, 2), ten cycles of charge and discharge were performed. In each cycle, charge was carried out until the potential of the positive electrode 1 with reference to the reference electrode 3 reached 5.0 V at a constant current of 0.1 It, and then discharge was carried out until the above-mentioned potential reached 2.0 V.

Furthermore, for the non-aqueous electrolyte secondary battery including the positive electrode active material obtained in Comparative Example (hereinafter, referred to as a non-aqueous electrolyte secondary battery of Comparative Example), ten cycles of charge and discharge were performed. In each cycle, charge was carried out until the potential of the positive electrode 1 with reference to the reference electrode 3 reached 5.0 V at a constant current of 0.1 It, and then discharge was carried out until the above-mentioned potential reached 2.5 V.

The current value at which a rated capacity is completely discharged for one hour is referred to as a rated current, represented as 1.0 C and represented as 1.0 It by SI (System International) unit.

(d-3) Evaluation of Charge/Discharge Test

Figure 5:
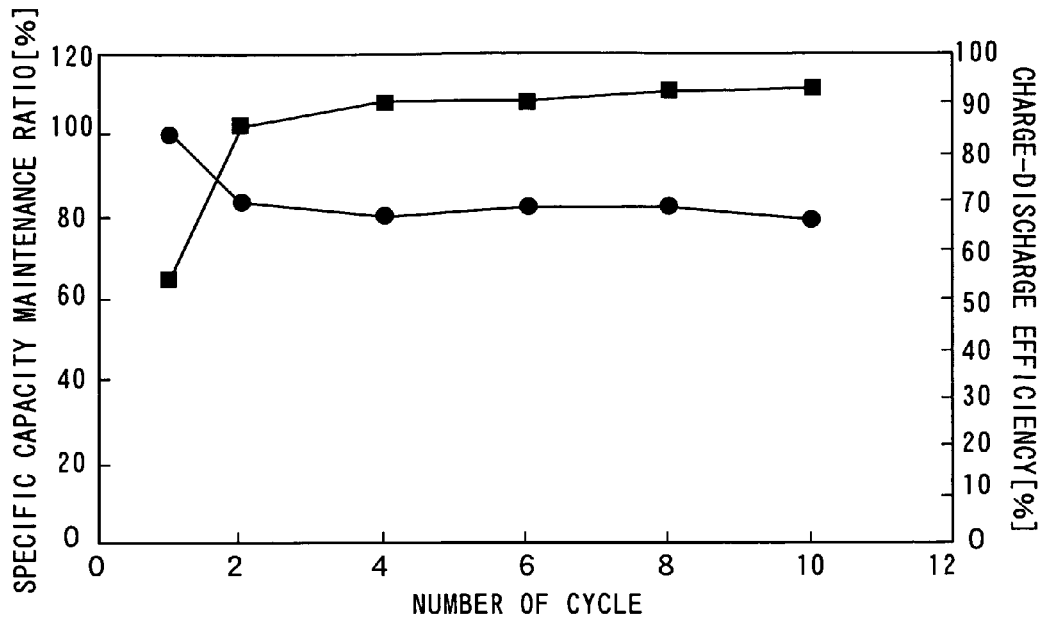
FIG. 5 is a graph showing charge/discharge characteristics of a non-aqueous electrolyte secondary battery in Inventive Example 1 in the case where x in a positive electrode active material is 0.1.
Figure 6:
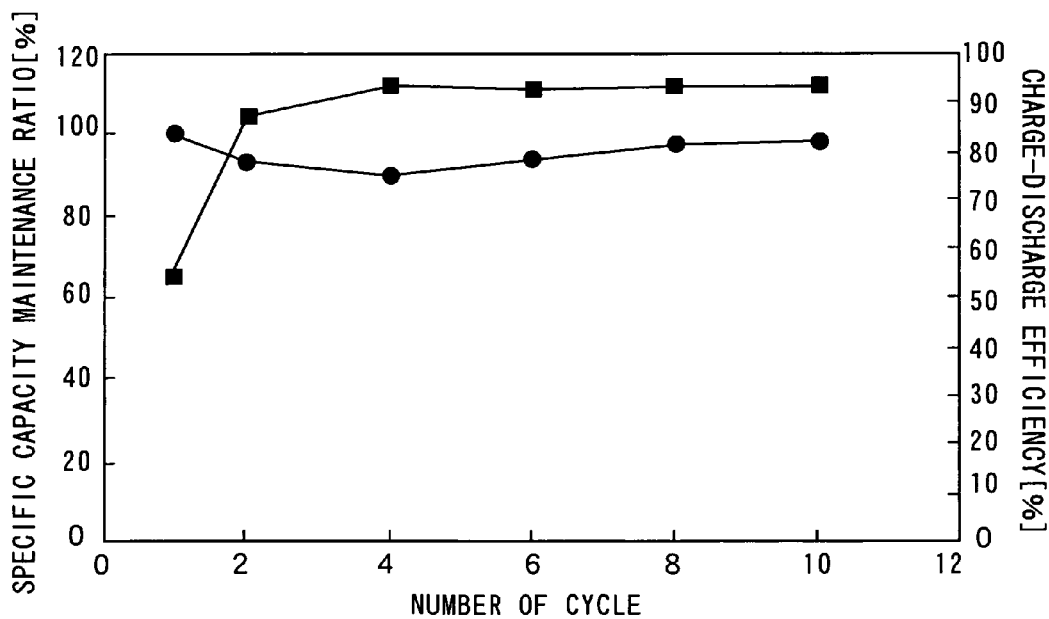
FIG. 6 is a graph showing the charge/discharge characteristics of the non-aqueous electrolyte secondary battery in Inventive Example 1 in the case where x in the positive electrode active material is 0.3.
Figure 7:
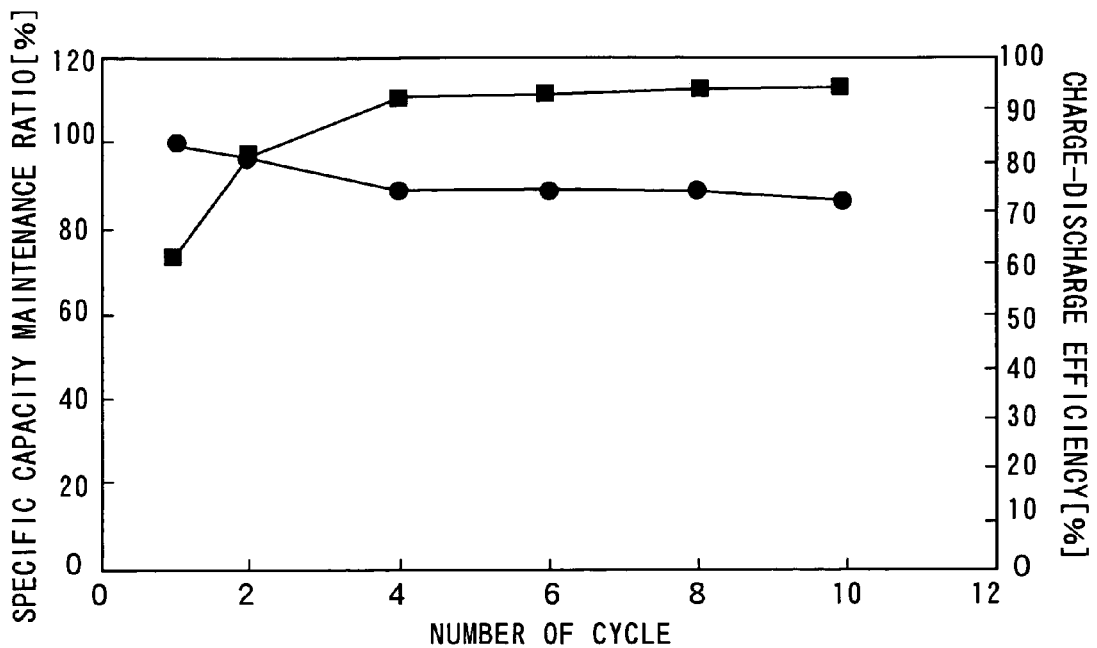
FIG. 7 is a graph showing the charge/discharge characteristics of the non-aqueous electrolyte secondary battery in Inventive Example 1 in the case where x in the positive electrode active material is 0.5.

FIG. 5 is a graph showing charge/discharge characteristics of the non-aqueous electrolyte secondary battery in Inventive Example 1 in the case where x in the positive electrode active material is 0.1, FIG. 6 is a graph showing the charge/discharge characteristics of the non-aqueous electrolyte secondary battery in Inventive Example 1 in the case where x in the positive electrode active material is 0.3 and FIG. 7 is a graph showing the charge/discharge characteristics of the non-aqueous electrolyte secondary battery in Inventive Example 1 in the case where x in the positive electrode active material is 0.5.

Figure 8:
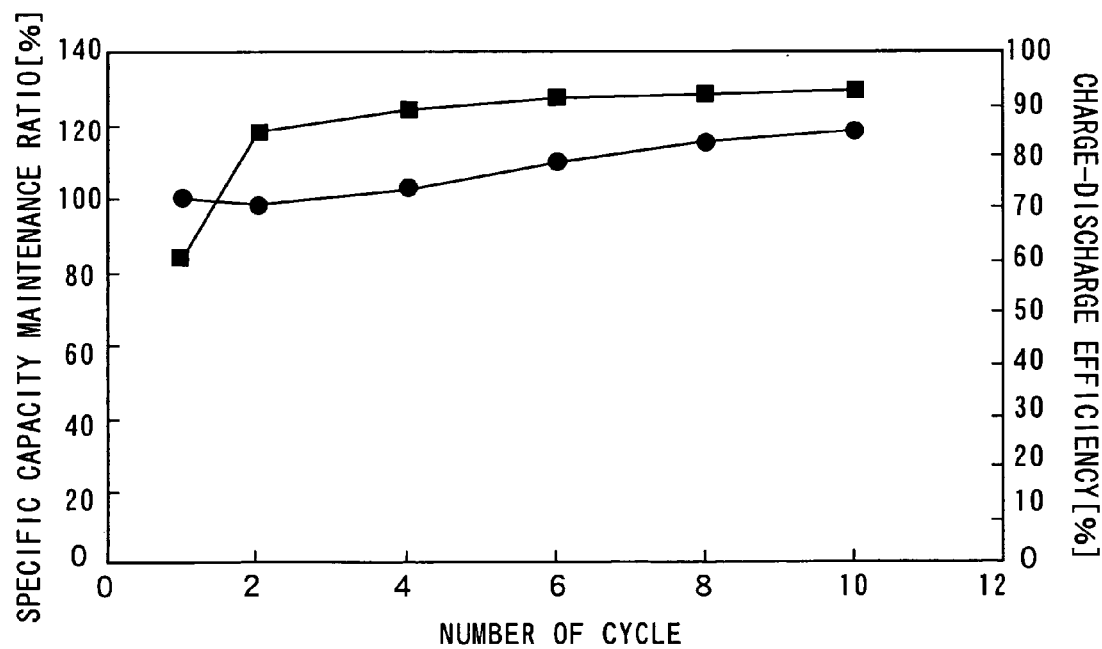
FIG. 8 is a graph showing charge/discharge characteristics of a non-aqueous electrolyte secondary battery in Inventive Example 2 in the case where x in a positive electrode active material is 0.1.
Figure 9:
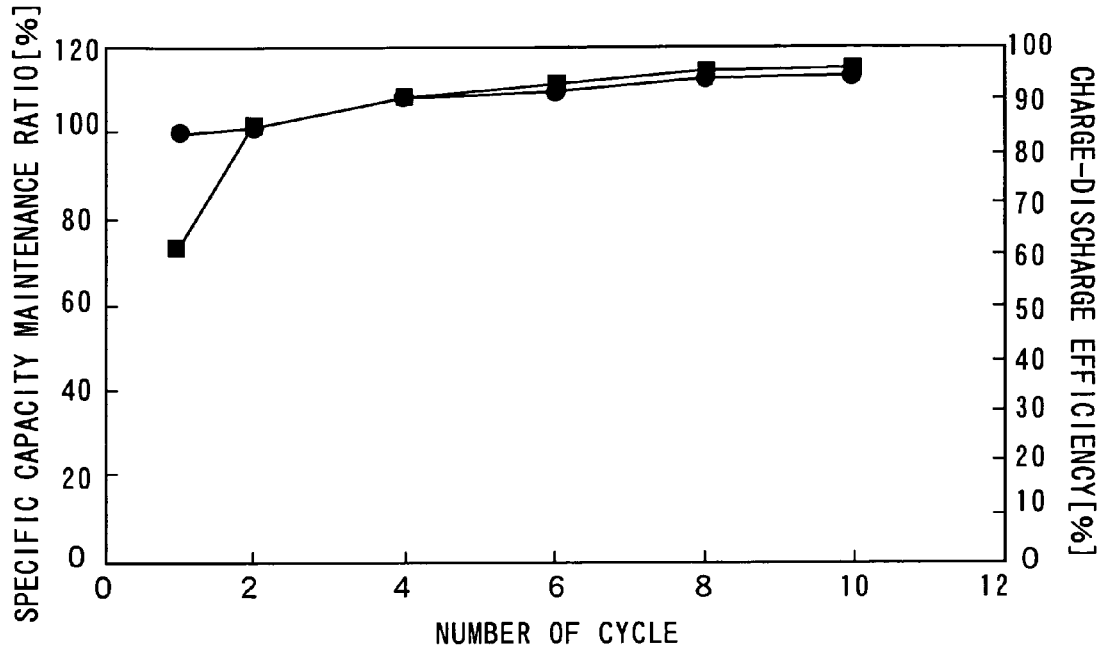
FIG. 9 is a graph showing the charge/discharge characteristics of the non-aqueous electrolyte secondary battery in Inventive Example 2 in the case where x in the positive electrode active material is 0.3.

Furthermore, FIG. 8 is a graph showing the charge/discharge characteristics of the non-aqueous electrolyte secondary battery in Inventive Example 2 in the case where x in the positive electrode active material is 0.1 and FIG. 9 is a graph showing the charge/discharge characteristics of the non-aqueous electrolyte secondary battery in Inventive Example 2 in the case where x in the positive electrode active material is 0.3.

Figure 10:
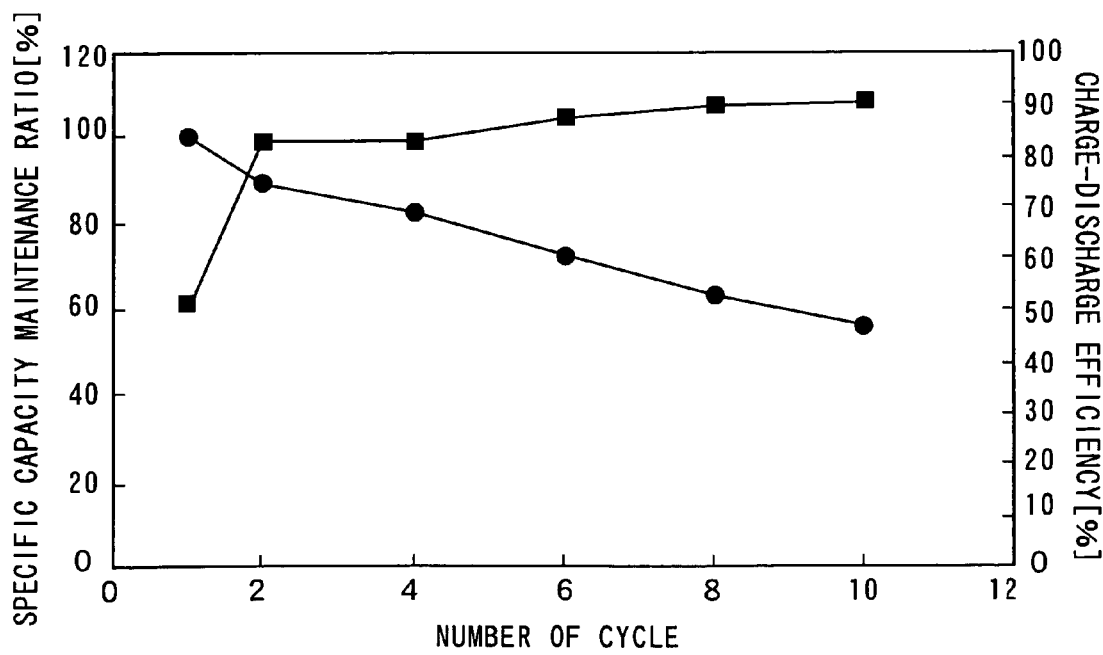
FIG. 10 is a graph showing charge/discharge characteristics of a non-aqueous electrolyte secondary battery in Comparative Example.

In addition, FIG. 10 is a graph showing charge/discharge characteristics of the non-aqueous electrolyte secondary battery in Comparative Example.

In FIGS. 5 to 10, the capacity maintenance ratios (%) indicated by black circles (●) and the charge-discharge efficiencies indicated by black squares (■) in the figures were used as indexes showing charge/discharge characteristics. Note that the capacity maintenance ratios are defined by the ratios of a specific discharge capacity in a predetermined cycle to that at the first cycle and the charge-discharge efficiencies are defined by the ratios of the specific discharge capacity to the specific charge capacity in a predetermined cycle.

As shown in FIGS. 5 to 7, the respective test results of the non-aqueous electrolyte secondary batteries in Inventive Example 1 indicate that the capacity maintenance ratios reached the range of 79.4 to 98.2% and the charge-discharge efficiencies reached the range of 92.5 to 93.9% in the tenth cycles, and thus high capacity maintenance ratios and charge-discharge efficiencies are ensured.

This is because lithium in $Li_2MnO_3$ was replaced by sodium, resulting in restraint of a phenomenon that some of lithium ions released from the positive electrode containing $Li_2MnO_3$ in the charge process are not stored in the positive electrode in the discharge process.

Here, although a sodium compound as impurities exists in $Li_{2-x}Na_xMnO_3$ in the case of X=0.5 as mentioned in FIG. 2, the charge-discharge characteristics are not deteriorated as indicated by FIG. 7. However, since the charge-discharge characteristics are deteriorated as the quantity of sodium further increases, it is found that the relation is preferably $0<x\leq 0.5$ in $Li_{2-x}Na_xMnO_3$.

As shown in FIGS. 8 and 9, the respective test results of the non-aqueous electrolyte secondary batteries in Inventive Example 2 indicate that the capacity maintenance ratios reached the range of 113.3 to 118.6% and the charge-discharge efficiencies reached the range of 92.6 to 95.2% in the tenth cycles, and thus higher capacity maintenance ratios and charge-discharge efficiencies than those in Inventive Example 1 are ensured.

Similarly to the above-mentioned, this is because lithium in $Li_2MnO_3$ was replaced by potassium, resulting in restraint of a phenomenon that some of lithium ions released from the positive electrode containing $Li_2MnO_3$ in the charge process are not stored in the positive electrode in the discharge process.

A large amount of potassium compound as impurities exists in $Li_{2-x}K_xMnO_3$ in the case of X=0.5 as mentioned in FIG. 3. As a result, charge and discharge could be hardly carried out. This result indicates that the relation is preferably $0<x\leq 0.3$ in $Li_{2-x}K_xMnO_3$.

In contrast, as shown in FIG. 10, as the number of the cycle of charge and discharge increases, the capacity maintenance ratios rapidly decrease in the non-aqueous electrolyte secondary battery in Comparative Example. More specifically, the charge-discharge efficiency was 90.3% while the capacity maintenance ratio was 56.0% in the tenth cycle.

This is considered to be because some of lithium ions released from $Li_2MnO_3$ in the charge process is not stored in the positive electrode and the quantity of the above-mentioned lithium ions that are not stored increases as the cycle of charge and discharge becomes longer.

(d-4) Conclusion $Li_{2-x}A_xMO_3$ obtained by replacing lithium in $Li_2MO_3$ having a layered structure by the alkali metal having the ion radius larger than that of lithium is used as a positive electrode active material. Thus, it is found that the interlayer space in the positive electrode active material is enlarged and lithium ions are easily stored in the positive electrode active material in a charge process. This makes it possible to increase the capacity maintenance ratio and charge-discharge efficiency.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A non-aqueous electrolyte secondary battery comprising:
 a positive electrode including a positive electrode active material and capable of storing and releasing lithium,
 a negative electrode capable of storing and releasing lithium; and
 a non-aqueous electrolyte,
 wherein said positive electrode active material contains a complex oxide including, lithium, an alkali metal and a transition metal, said alkali metal has ion radius larger than that of lithium,
 said transition metal includes a transition metal that can be tetravalent or a plurality of transition metals of which average valence can be tetravalent, said complex oxide includes $Li_{2-x}A_xMO_3$, said x is more than 0 and not more than 0.5, said A is an alkali metal, and said M is a transition metal.

2. The non-aqueous electrolyte secondary battery according to claim 1, wherein said alkali metal is sodium.

3. The non-aqueous electrolyte secondary battery according to claim 1, wherein said alkali metal is potassium, and said x is more than 0 and not more than 0.3.

4. The non-aqueous electrolyte secondary battery according to claim 1, wherein said transition metal that can be tetravalent is manganese.

* * * * *